April 22, 1930.  U. S. EBERHARDT  1,755,916
SHAFT ADVANCING MECHANISM FOR USE IN HOBBING
LONG MULTIPLE GROOVES IN SHAFTS
Filed Dec. 19, 1928    2 Sheets-Sheet 1

INVENTOR
U. SETH EBERHARDT
BY
ATTORNEY

April 22, 1930. U. S. EBERHARDT 1,755,916
SHAFT ADVANCING MECHANISM FOR USE IN HOBBING
LONG MULTIPLE GROOVES IN SHAFTS
Filed Dec. 19, 1928 2 Sheets-Sheet 2

INVENTOR
U. SETH EBERHARDT
BY
*Fred T. Schustr*
ATTORNEY

Patented Apr. 22, 1930

1,755,916

UNITED STATES PATENT OFFICE

ULRICH SETH EBERHARDT, OF MAPLEWOOD, NEW JERSEY, ASSIGNOR TO NEWARK GEAR CUTTING MACHINE COMPANY, INC., OF NEWARK, NEW JERSEY, A CORPORATION OF NEW JERSEY

SHAFT-ADVANCING MECHANISM FOR USE IN HOBBING LONG MULTIPLE GROOVES IN SHAFTS

Application filed December 19, 1928. Serial No. 326,955.

The invention relates to machines for grooving shafts, particularly by means of a hobbing cutter; and it relates more especially to mechanism whereby grooves of any desired length may be cut into spline shafts by means of such cutter. It has for its object means of this character which may be attached to an existing gear hobbing machine or be initially built integrally therewith; and wherein all of the actuating members for advancing the shaft are substantially concealed within the said means, thus affording a self-contained attachment or member for expeditiously handling the advance of the shaft to be grooved, it being understood that the hob cutter preferably has no translatory movement but merely a rotary one, the blank or shaft traveling in the direction of its axis as well as rotating about the same.

In carrying out the invention, there is associated with the usual rotatable hollow work-spindle of a gear hobbing machine adapted for the grooving of shafts, the novel advancing head which is arranged with a hollow portion rotating therewith, and comprises also an element fixed with respect to the frame of the machine and provided with a gear for engagement with the hollow rotatable element mounted within said stationary element. The said rotatable hollow element to this end carries within itself gearing meshing with the gear of the stationary element to be rotated thereby when the element is rotated and, in turn, rotating cooperating gripping means adapted for engagement with the shaft to advance the latter.

Provision is made, also, for so mounting the gripping means, driven and carried by this hollow rotatable element, that said gripping means are yieldingly urged against said shaft substantially in a radial direction; and, that the shaft is secured with reference to said hollow rotatable element in manner to prevent rotation relatively thereto but is allowed axial movement thereof.

The nature of the invention, however, will best be understood when described in connection with the accompanying drawings, in which.

Figure 1:
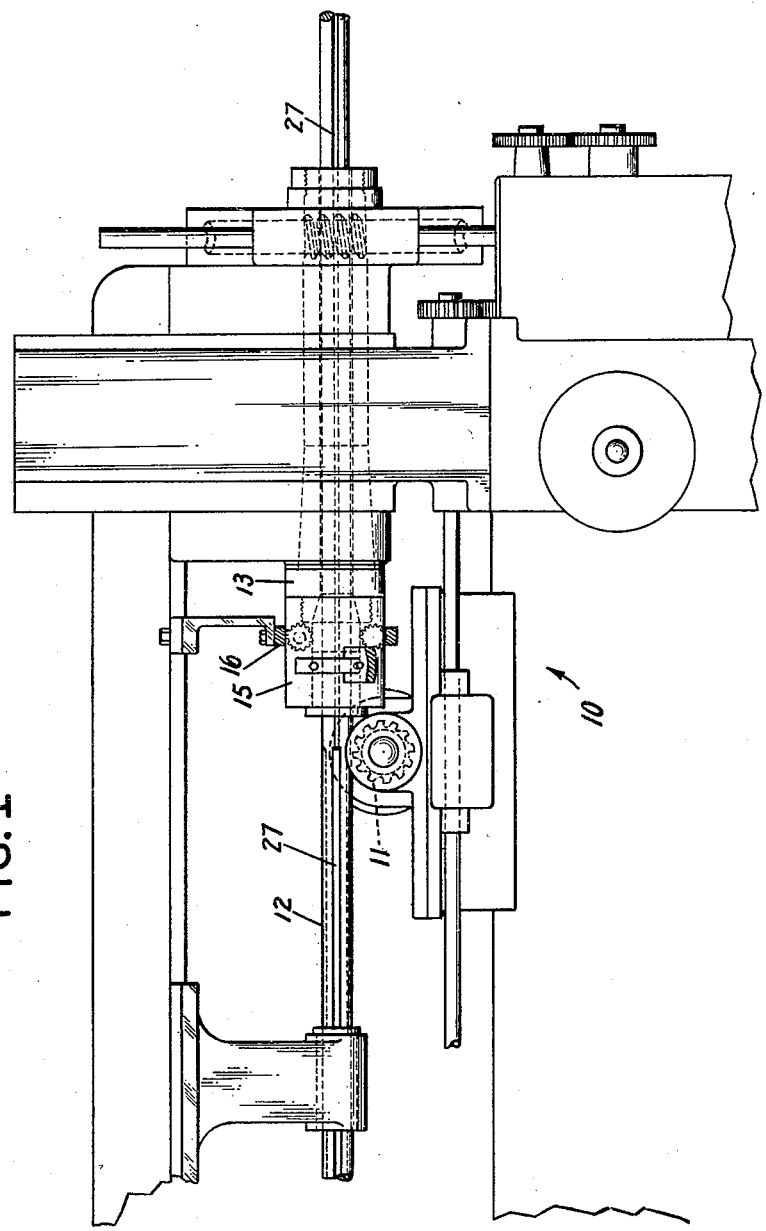
Fig. 1 is a side elevation of a gear hobbing machine equipped with the novel advancing means.
Figure 2:
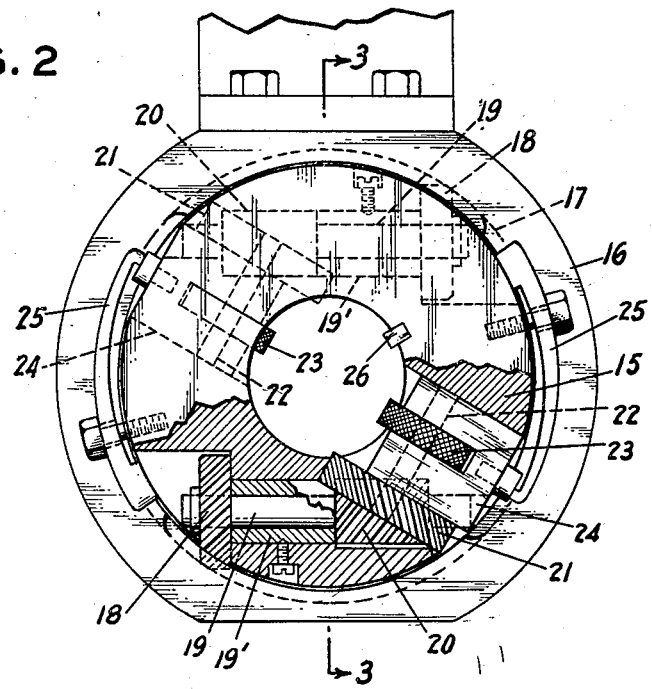
Fig. 2 is an enlarged end view of the novel advancing means with portions broken away.
Figure 3:
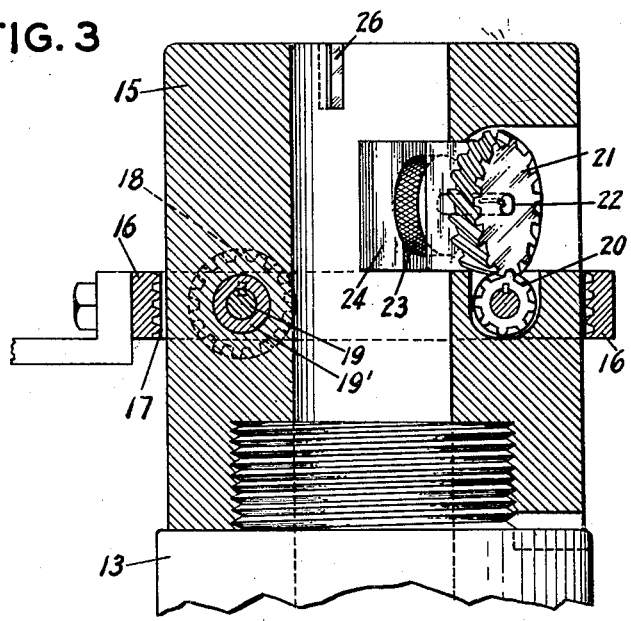
Fig. 3 is a vertical section through the advancing means taken on the line 3—3, Fig. 2 of the drawings, and looking in the direction of the arrows.

Referring to the drawings, 10 designates a gear hobbing machine, such, for example, as that disclosed in U. S. Letters Patent No. 978,113, with the exception that the hobbing cutter 11 thereof is, in the present instance, not intended, during operation on long shafts, for translatory movement—the blank pinion rod 12 to be cut thereby being arranged not only for travel in the direction of its axis but also to have a rotary motion about said axis, so that the cutter may simultaneously and continuously cut all of the teeth of the rod.

In said machine, 13 designates the work spindle of the machine, which spindle is hollow to accommodate the shaft or blank 12 to be cut. This spindle is threaded at the outer end to receive a work head 15 rotatable thereby and which comprises also a hollow cylinder through which the blank may pass. Surrounding the head 15 is stationary member 16, for example, in the nature of a ring, which may be secured to the frame of the machine, the cylinder 15 being rotatable relatively thereto; and, furthermore, is designed to carry driving means in threaded engagement with the internal surface of said ring. The latter to this end is constructed as a suitable gear, for example, by providing the same with the internal gear teeth or worm thread 17.

Within the hollow cylinder 15 is mounted for rotation a pair of diametrically disposed worm-wheels 18 which project sufficiently beyond the periphery of said cylinder to enter into engagement with the worm thread 17 so that, when relative rotation occurs between the stationary part 16 and the rotatable cylindrical part 15 of the work head the two wheels 18 will be correspondingly rotated within the same. These wheels, in turn, are mounted on respective shafts 19, passing through bushings 19', and each of these shafts carries also a helical gear wheel 20 meshing with its mating gear 21 on a shaft 22—all being suitably mounted in and carried within the said work head. Rotation is thus imparted to the shafts 22 as the entire head is rotated; and the respective shafts are arranged to carry and to rotate a wheel 23 knurled or otherwise roughened to afford a friction surface for engaging the shaft or blank inserted through the two coaxial heads and advance the same thereby proportionately to the rotation, the said wheels to this end being inwardly directed and disposed diametrically opposite each other.

Moreover, to exert a yielding pressure through their wheels 23 on the shaft passing therebetween, as well as to provide adjustment accommodating various diameters of work, the shafts carrying the said wheels 23 are mounted in respective blocks 24 slidable in the work head and against the outer face of which is applied the force of a flat spring 25 secured to the periphery of the head.

In order to insure against any circular displacement of the blank in its axial translation through the head 15, the latter is provided at its outer end with a key 26 adapted to fit a corresponding guiding keyway 27 of the blank and initially provided therein by milling or otherwise and in well known manner.

I claim:

1. In a shaft grooving machine embodying a hobbing cutter to effect the cutting of longitudinal grooves in a shaft, and a rotatable work spindle through which said shaft is adapted to pass: a shaft advancing or work head comprising an element fixed with reference to the frame of the machine, a gear carried thereby, and a hollow element rotatable with said work spindle and mounted within the said stationary element; gearing carried within the said hollow rotatable element and in engagement with the gear of the associated stationary element to be rotated thereby; and gripping means for the shaft also carried within the hollow rotatable element and driven from its gearing, when the work spindle is rotated, to advance the shaft axially through the work head and work spindle.

2. In a shaft grooving machine embodying a hobbing cutter to effect the cutting of longitudinal grooves in a shaft, and a rotatable work spindle through which said shaft is adapted to pass: a shaft advancing or work head comprising an element fixed with reference to the frame of the machine and provided with an internal worm thread, and a hollow element rotatable with said work spindle and mounted within the said stationary element; a pair of worm wheels diametrically disposed within the said hollow rotatable element and in engagement with the worm thread of the associated stationary element to be rotated thereby; and gripping means for the shaft also carried within the hollow rotatable element and driven from its gearing, when the work spindle is rotated, to advance the shaft axially through the work head and work spindle.

3. In a shaft grooving machine embodying a hobbing cutter to effect the cutting of longitudinal grooves in a shaft, and a rotatable work spindle through which said shaft is adapted to pass: a shaft advancing or work head comprising an element fixed with reference to the frame of the machine, a gear carried thereby, and a hollow element rotatable with said work spindle and having gearing in engagement with the gear of the associated stationary element to be rotated thereby, said hollow element being mounted within the said stationary element and having means for slidably engaging a longitudinal groove of the shaft to locate positively the same against rotation relative thereto.

4. In a shaft grooving machine embodying a hobbing cutter to effect the cutting of longitudinal grooves in a shaft, and a rotatable work spindle through which said shaft is adapted to pass: a shaft advancing or work head comprising an element fixed with reference to the frame of the machine, a gear carried thereby, and a hollow element rotatable with said work spindle and mounted within the said stationary element; gearing carried within the said hollow rotatable element and in engagement with the gear of the associated stationary element to be rotated thereby, a pair of helical gears driven thereby, a pair of cooperating gripping wheels for engaging the shaft to be grooved, and respective helical gears rigidly connected therewith and meshing with said first-named helical gears, the gripping wheels and associated helical gears being yieldingly supported within the hollow rotatable element to have a limited radial movement.

5. In a shaft grooving machine embodying a hobbing cutter to effect the cutting of longitudinal grooves in a shaft, and a rotatable work spindle through which said shaft is adapted to pass: a shaft advancing or work head comprising an element fixed with reference to the frame of the machine, a gear carried thereby, and a hollow element rotatable with said work spindle and mounted within the said stationary element; gearing carried within the said hollow rotatable element and in engagement with the gear of the associated stationary element to be rotated thereby, a pair of shafts mounted in the hollow rotatable element, carrying said gearing and rotated thereby, two helical gears secured to the respective shafts for rotation therewith, a bushing between the two gears of each of said shafts and of a diameter at least equal to that of the helical gear, a pair of cooperating gripping wheels for engaging the shaft to be grooved, and respective helical gears rigidly connected therewith and meshing with said first-named helical gears.

In testimony whereof I affix my signature.

U. SETH EBERHARDT.